(12) United States Patent
Zhang et al.

(10) Patent No.: US 10,945,130 B2
(45) Date of Patent: Mar. 9, 2021

(54) METHOD FOR ESTABLISHING WIRELESS CONNECTION FOR APPLICATION OF USER EQUIPMENT

(71) Applicant: SHANGHAI LIANSHANG NETWORK TECHNOLOGY CO., LTD., Shanghai (CN)

(72) Inventors: FaYou Zhang, Shanghai (CN); Yue Fang, Shanghai (CN)

(73) Assignee: SHANGHAI LIANSHANG NETWORK TECHNOLOGY CO., LTD., Shanghai (CN)

( * ) Notice: Subject to any disclaimer, the term of this patent is extended or adjusted under 35 U.S.C. 154(b) by 61 days.

(21) Appl. No.: 16/005,443

(22) Filed: Jun. 11, 2018

(65) Prior Publication Data
US 2018/0295658 A1  Oct. 11, 2018

Related U.S. Application Data

(63) Continuation of application No. PCT/CN2016/070692, filed on Jan. 12, 2016.

(30) Foreign Application Priority Data

Dec. 14, 2015 (CN) .......................... 201510934145.3

(51) Int. Cl.
*H04W 72/04* (2009.01)
*H04W 12/06* (2021.01)
(Continued)

(52) U.S. Cl.
CPC ........... *H04W 12/06* (2013.01); *H04W 48/16* (2013.01); *H04W 48/20* (2013.01); *H04W 76/10* (2018.02)

(58) Field of Classification Search
CPC ..... H04W 76/10; H04W 12/06; H04W 48/16; H04W 48/20
See application file for complete search history.

(56) References Cited

U.S. PATENT DOCUMENTS

| 8,126,145 | B1 * | 2/2012 | Tewari ................. H04L 9/0841 380/255 |
| 2007/0123223 | A1 * | 5/2007 | Letourneau ....... H04M 3/42161 455/414.1 |

(Continued)

FOREIGN PATENT DOCUMENTS

| CN | 101801062 A | 8/2010 |
| CN | 103327578 A | 9/2013 |

(Continued)

OTHER PUBLICATIONS

The World Intellectual Property Organization (WIPO) International Search Report and Written Opinion for PCT/CN2016/070692 Aug. 26, 2016 5 Pages.

*Primary Examiner* — Hassan Kizou
*Assistant Examiner* — Mahbubul Bar Chowdhury
(74) *Attorney, Agent, or Firm* — Bayramoglu Law Offices LLC

(57) ABSTRACT

Provided are a method and an apparatus for establishing a wireless connection for an application of a user equipment. In comparison with the prior art, the present application is applied to detect whether a first application has a communication requirement, and call a corresponding third-party connection module to execute a wireless connection operation when there is a communication requirement. The wireless connection operation comprises: sending a wireless access point information request to a corresponding network equipment; receiving one or more pieces of wireless access point information sent by the network equipment based on the wireless access information request; and establishing a
(Continued)

--- detecting whether a first application includes a communication requirement — S1 performing the wireless connection by activating a third party connection module when the first application includes the communication requirement — S2 wireless connection between the user equipment and the corresponding wireless access point according to at least one piece of information in the one or more pieces of wireless access point information so as to realize the communication requirement of the first application.

7 Claims, 4 Drawing Sheets

(51) Int. Cl.
*H04W 48/20* (2009.01)
*H04W 76/10* (2018.01)
*H04W 48/16* (2009.01)

(56) References Cited

U.S. PATENT DOCUMENTS

| | | | | |
|---|---|---|---|---|
| 2007/0139168 A1* | 6/2007 | Rennie | ................... | H04L 67/12 |
| | | | | 340/425.5 |
| 2007/0184832 A1* | 8/2007 | Faccin | ............. | H04W 12/1206 |
| | | | | 455/432.1 |
| 2008/0285508 A1* | 11/2008 | Low | ...................... | H04W 76/15 |
| | | | | 370/329 |
| 2010/0291910 A1* | 11/2010 | Sanding | ................ | H04W 8/183 |
| | | | | 455/418 |
| 2010/0329149 A1* | 12/2010 | Singh | .................. | H04L 12/4625 |
| | | | | 370/254 |
| 2013/0081113 A1* | 3/2013 | Cherian | .................. | H04W 4/70 |
| | | | | 726/4 |
| 2013/0198817 A1* | 8/2013 | Haddad | .................. | H04L 63/18 |
| | | | | 726/5 |
| 2013/0329666 A1 | 12/2013 | Degani et al. | | |
| 2014/0293829 A1* | 10/2014 | Visuri | .................. | H04L 12/145 |
| | | | | 370/254 |
| 2015/0341500 A1* | 11/2015 | Rios | .................... | H04M 7/1235 |
| | | | | 379/93.06 |
| 2016/0269901 A1* | 9/2016 | Cao | ....................... | H04W 12/06 |
| 2017/0070881 A1* | 3/2017 | Sun | .......................... | H04L 63/08 |

FOREIGN PATENT DOCUMENTS

| | | |
|---|---|---|
| CN | 103582170 A | 2/2014 |
| CN | 105120462 A | 12/2015 |

* cited by examiner

METHOD FOR ESTABLISHING WIRELESS CONNECTION FOR APPLICATION OF USER EQUIPMENT

CROSS REFERENCE TO RELATED APPLICATION

This application is a continuation application of PCT Application No. PCT/CN2016/070692, filed on Jan. 12, 2016, which claims priority and benefits of Chinese Patent Application No. 201510934145.3, filed with State Intellectual Property Office on Dec. 14, 2015, the entire content of which is incorporated herein by reference.

BACKGROUND OF THE INVENTION

Field of the Invention

The present invention relates to the computing field, and in particular, to a technology for a method for establishing wireless connection for application of user equipment.

Descriptions of the Related Art

With the development and popularization of smart terminals and mobile Internet technologies, applications such as APP (application) have gradually become the main carriers for people to work, study or live. These applications usually need to be accessed to a wireless network by a smart terminal. Different types of applications require different wireless networks as well. For example, payment applications more focus on secure wireless networks, and video applications more focus on wireless networks with larger bandwidths. However, in the conventional art, different wireless networks suitable for different applications are not selected for users based on the different applications, and better experience for users is not provided.

SUMMARY OF THE INVENTION

The object of the present application is to provide an apparatus and a method for establishing a wireless connection for application of a user equipment.

A method for establishing a wireless connection for application of user equipment according to an aspect of the present application is provided. The application includes a first application. The method includes detecting whether the first application includes a communication requirement; and performing the wireless connection by activating a third party connection module when the first application includes the communication requirement.

The wireless connection includes transmitting a request of wireless access information to a network equipment; receiving access information of one or multiple wireless access points transmitted by the network equipment in response to the request; and establishing the wireless connection between the user equipment and one of the wireless access points in response to the access information of at least one of the one or multiple wireless access points to realize the communication requirement of the first application.

An apparatus for establishing a wireless connection for an application of user equipment provided in another aspect of the present application is provided. The equipment includes a detecting equipment, configured to detect whether the first application includes a communication requirement; and a performing equipment, configured to perform the wireless connection by activating a third party connection module when the first application includes the communication requirement; wherein the performing wireless connection includes transmitting a request of wireless access information to a network equipment; receiving access information of one or multiple wireless access points transmitted by the network equipment in response to the request; and establishing the wireless connection between the user equipment and one of the wireless access points in response to the access information of at least one of the one or multiple wireless access points to realize the communication requirement of the first application.

Compared with the conventional art, the present application detects that whether the first application includes the communication requirement in the user equipment. When there is the communication requirement, the present application performs the wireless connection by activating the corresponding third party connection module. The performing wireless connection includes transmitting the request of wireless access information to the corresponding network equipment; receiving access information of one or multiple wireless access points transmitted by the corresponding network equipment in response to the request; and establishing the wireless connection between the user equipment and one of the wireless access points in response to the access information of at least one of the one or multiple wireless access points to realize the communication requirement. In this way, the user is provided with a suitable wireless access point according to different types of applications, and the user experience for a variety of different applications is enhanced.

Moreover, the first application of the present application can further include a kernel-level application of the user equipment. That is, when the first application has established the wireless connection with the wireless access point suitable for the application, other application of the user equipment can also via the wireless access points to establish a wireless connection in order to realize the communication requirements of other applications. In this way, the optimal wireless access point suitable for the first application is selected, the user experience on the first application can be guaranteed, and the user's adoption of other applications is not affected.

In addition, the present application can also realize that when the first application includes the communication requirement, the corresponding third party connection module is loaded in real time to perform the wireless connection. In this case, the corresponding third party connection module already exists on the user equipment and the corresponding network equipment does not need to provide it again. When the first application has the communication requirement, the user equipment can establish the wireless connection with the corresponding wireless access point as long as the user equipment loads the third party connection module in real time, thereby increasing the speed for the user to establish the wireless connection.

BRIEF DESCRIPTION OF THE FIGURES

Other features, objects, and advantages of the present invention become more apparent upon reading the detailed description of the embodiments with reference to the following figures.

The same or similar reference numbers in the figures represent the same or similar components.

DESCRIPTION OF THE PREFERRED EMBODIMENT

The present invention will be further described in detail below with reference to the accompanying figures.

In a typical configuration of the present invention, each of terminals, service network stations, and the trusted terminals comprises one or more processors (CPUs), input/output interfaces, network interfaces, and storage components.

The storage components may be non-volatile memory, random access memory (RAM) and/or non-volatile memory of computer-readable media, such as read-only memory (ROM) or flash RAM. The storage components are an example of a computer readable medium.

Computer readable media include permanent and non-permanent, removable and non-removable media which store information in any method or technology. The information can be computer readable instructions, data structures, modules of programs, or other data. Examples of computer storage media comprise, but are not limited to, phase change memory (PRAM), static random access memory (SRAM), dynamic random access memory (DRAM), random access memory (RAM), ROM, EEPROM, flash memory, CD-ROM, DVD, magnetic cassettes, magnetic tape storage, or any other medium that can be used to store information and accessed by a computer. As defined herein, computer readable media do not comprise non-transitory media such as modulated data signals and carriers.

To further elaborate the technical approaches and the effects of the present invention, the technical solutions of the present invention are clearly and completely described below with reference to the accompanying figures and preferred embodiments.

Figure 1:
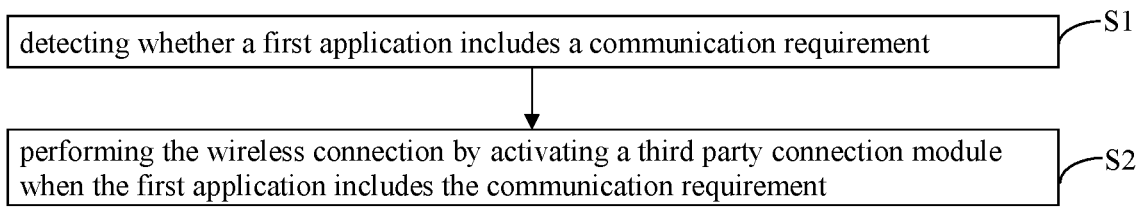
FIG. 1 shows a flow chart of a method for establishing a wireless connection for application of user equipment according to an aspect of the present invention.

FIG. 1 shows a flow chart of a method for establishing a wireless connection for application of user equipment according to an aspect of the present invention. The application includes a first application. The method includes:

S1, detecting whether the first application includes a communication requirement; and S2, performing the wireless connection by activating a third party connection module when the first application includes the communication requirement.

The wireless connection includes transmitting a request of wireless access information to a network equipment; receiving access information of one or multiple wireless access points transmitted by the network equipment in response to the request; and establishing the wireless connection between the user equipment and one of the wireless access points in response to the access information of at least one of the one or multiple wireless access points to realize the communication requirement of the first application.

In this embodiment, in the step S1, it detects that whether the first application includes a communication requirement, wherein the first application can include a social application, a payment application, a game application, a video application, and those applications which can be downloaded in the each application market. The first application can also include an application provided by the user equipment system. The communication requirement can include that the application is activated, a page is refreshed by the user in the application, information is transmitted and received in the application, etc. Specifically, the manner of detecting whether t the first application includes a communication requirement can include activating a third-party plug-in member within the first application.

In this embodiment, in the step S2, the wireless connection is performed by activating a third party connection module when the first application includes the communication requirement. The third party connection module is configured to establish the wireless connection between the wireless access point and the user equipment. Preferably, the network equipment provides the third party connection module. Specifically, when the user equipment needs to establish the wireless connection with the wireless access point, the corresponding network equipment provides the third party connection module to the user equipment to establish a wireless connection. Moreover, when the user equipment needs the same third party connection module to establish the wireless connection again, if the third party connection module already exists in the user equipment, the user equipment can directly load the third party connection module to establish the wireless connection. If the third party connection module does not exist in the user equipment, the corresponding network equipment will provide the third party connection module again to the user equipment to establish the wireless connection. Specifically, when the first application includes the communication requirement, that is, the first application needs to establish the wireless connection, the user equipment activates the third party connection module to perform the wireless connection.

Preferably, the step S2 includes real-time loading the third party connection module when the first application includes the communication requirement. For example, if the user equipment has established the wireless connection with a certain wireless access point through the third party connection module or the third party connection module already exists in the user equipment, when the first application includes the communication requirement, the user equipment can load in real time the third party connection module existing on the user equipment to perform the wireless connection. For example, if the first application is a video application, the video application had previously downloaded the video through the China Mobile's wireless hotspot. That is, the user equipment has included the third party connection module corresponding to the China Mobile's hotspot. When the video application needs to download the video again, it just needs to load the third party connection module in real time to perform the wireless connection.

Performing the wireless connection includes:

S21 (not shown), transmitting a request of wireless access information to a network equipment;

S22 (not shown), receiving access information of one or multiple wireless access points transmitted by the network equipment in response to the request; and S23 (not shown), establishing the wireless connection between the user equipment and one of the wireless access points in response to the access information of at least one of the one or multiple wireless access points to realize the communication requirement.

In step S21, the request of the wireless access information is transmitted to the corresponding network equipment, where the network equipment is configured to provide the user equipment with the third party connection module and the wireless access point that is preferably suitable for the first application to establish the wireless connection. The request of the wireless access information is used to request the wireless access point that is preferably suitable for the first application, from the network equipment corresponding to the first application. Specifically, the first application transmits the request of the wireless access information to the corresponding network equipment in response to the respective communication protocol via the wireless connection established between the network equipment and the user equipment.

Preferably, the request of the wireless access information includes application-related information of the first application.

More preferably, the application-related information includes at least one of application type information of the first application and communication type information associated with the communication requirement.

Specifically, the application types include but are not limited to applications that can exist in the user equipment, such as social applications, payment applications, game applications, video applications, shopping applications, O2O applications, and so on. The communication types include but are not limited to transmitting-receiving Information, online payment, video downloads, online shopping, and so on, that can achieve information exchange through the applications. The application type information or the communication type information includes at least one of a security priority type, a bandwidth priority type, and a connection success rate priority type. Specifically, the security priority type refers to the primary consideration of security factors when making wireless access point selection. The security priority type should be prioritized for applications that involve very important information about the user's privacy or property information. For example, for payment applications, secure wireless access points should be chosen. The bandwidth priority type refers to the primary consideration of bandwidth factors when making wireless access point selection. The bandwidth priority should be prioritized for applications that require greater bandwidth for a better experience. For example, for some game applications or video applications, in order to enhance the user experience, a larger bandwidth wireless access point should be selected. The connection success rate priority type refers to the primary consideration of connection success rate when making wireless access point selection, for the applications related to transmitting-receiving or browsing information and other types of applications, as long as the connection success rate priority can be considered. For example, for social applications, the wireless access point that is easy to be connected should be selected.

In the step S22, access information of one or multiple wireless access points transmitted by the network equipment in response to the request is received, wherein the access information matches the application-related information. Those skilled in the art can understand that when the network equipment receives the request of wireless access information transmitted by the first application, the access information of one or multiple wireless access points suitable for the first application can be selected and transmitted to the first application. Correspondingly, the first application receives the information. Specifically, the first application receives the access information of one or multiple wireless access points transmitted by the network equipment in response to the request, based on the respective communication protocol via the wireless connection established between the network equipment and the user equipment. The access information matches the application-related information. For example, if the application-related information of the first application is a security priority type, the request of wireless access information correspondingly requests access to the security priority type wireless access point, and accordingly, the corresponding network equipment selects the access information of one or multiple wireless access points, and transmits the access information to the first application. Correspondingly, the first application receives the access information of the security priority type wireless access point.

In step S23, the wireless connection between the user equipment and one of the wireless access points in response to the access information of at least one of the one or multiple wireless access points is established to realize the communication requirement, wherein the first application can include an "application-level application" and a "kernel-level application". For the application-level application, if the application has established the wireless connection with one wireless access point, other application of the user equipment may not be able to establish a wireless connection through this wireless access point. It needs to select preferable wireless access points again through the corresponding network equipment for other applications and achieves the communication requests of other applications. Those skilled in the art can understand that the corresponding network equipment preferably selects the access information of one or multiple wireless access points suitable for the application of the user equipment, and the user can select a wireless access point to be used according to his/her own requirement so as to establish the wireless connection between the user equipment and the wireless access point to realize the communication requirement. Specifically, when the corresponding network equipment selects a wireless access point suitable for the first application in the user equipment, the user selects the wireless access point to establish the wireless connection between the user equipment and the wireless access point to realize the communication requirement. When the corresponding network equipment selects multiple wireless access points suitable for the first application in the user equipment, the user can select one of the multiple wireless access points to establish the wireless connection between the user equipment and the wireless access point to realize the communication requirement.

Preferably, the third party connection module includes connection frame information generated in response to security policy information of the corresponding wireless access point, and the wireless access point information includes connection authentication information of the corresponding wireless access point, wherein the connection authentication information is generated in response to security authentication information of the corresponding wireless access point.

The establishing the wireless connection between the user equipment and one of the wireless access points in response to the access information of at least one of the one or multiple wireless access points includes performing one of the connection authentication information and the connection frame information of the access information of the wireless access points to establish the wireless connection.

Specifically, the security policy information and the security authentication information are set by a provider of the wireless access point, and the security policy information can include authentication methods or processes of the provider to the user equipment requesting to access the wireless access point and token or identity authentication. Preferably, the connection authentication information includes access token information or an access account and password information of the wireless access point. The connection frame information and the connection authentication information are respectively generated in response to the security policy information and the security authentication information of the wireless access point, and the different security policy information corresponds to different connection frame information, wherein the connection frame information can exist in the form of a frame package. Similarly, different security authentication information corresponds to different connection authentication information.

The establishing the wireless connection between the user equipment and one of the wireless access points in response to the access information of at least one of the one or multiple wireless access points includes performing one of the connection authentication information and the connection frame information of the access information of at least one of the one or multiple wireless access points to establish the wireless connection between the user equipment and the corresponding wireless access point. Those skilled in the art can understand that when the user selects a wireless access point to be wirelessly connected from the one or multiple wireless access point information, the wireless connection between the user equipment and the wireless access point needs to be established. Specifically, the connection authentication information and the connection frame information corresponding to the wireless access point need to be performed. The specific performing method can include loading a frame package corresponding to the connection frame information corresponding to the wireless access point and inputting corresponding connection authentication information. For example, the wireless access point selected by the user is a wireless hot spot of China Telecom and the security policy information corresponding to the wireless hotspot is verified by a token. The user equipment for establishing a wireless connection with the wireless hotspot needs to load the frame package corresponding to the security policy information and input the token provided by China Telecom.

More preferably, the establishing the wireless connection between the user equipment and one of the wireless access points in response to the access information of at least one of the one or multiple wireless access points includes transmitting an access information request of a target access point to the network equipment in response to a selection operation of the user to the target access point; and establishing the wireless connection between the user equipment and the target access point in response to the access information of the target access point returning from the network equipment.

The access information includes information required for establishing a network connection through a wireless access point, and generally includes information such as an SSID, a MAC address, and an access password of the wireless access point. Specifically, when the network equipment preferably selects one wireless access point information for the user, the wireless access point is a target access point. When the network equipment selects multiple wireless access point information for the user, the user first selects one wireless access point from the multiple wireless access points as the target access point, and the specific selection manner can be based on the user's own preference. After determining the target hotspot, the user equipment transmits an access information request about the target access point to the corresponding network equipment. Correspondingly, the network equipment returns information such as an SSID, a MAC address, and an access password of the target access point, the user equipment can automatically establish a wireless connection with the target access point in response to the information, or the user can also manually input and establish the wireless connection between the user equipment and the target access point in response to the information. For example, when the access information is an access password, the user receives the password returned by the network equipment and simply enters the password to establish the wireless connection between the user equipment and the target access point.

In a preferred embodiment, the first application includes a kernel-level application of the user equipment.

Figure 2:
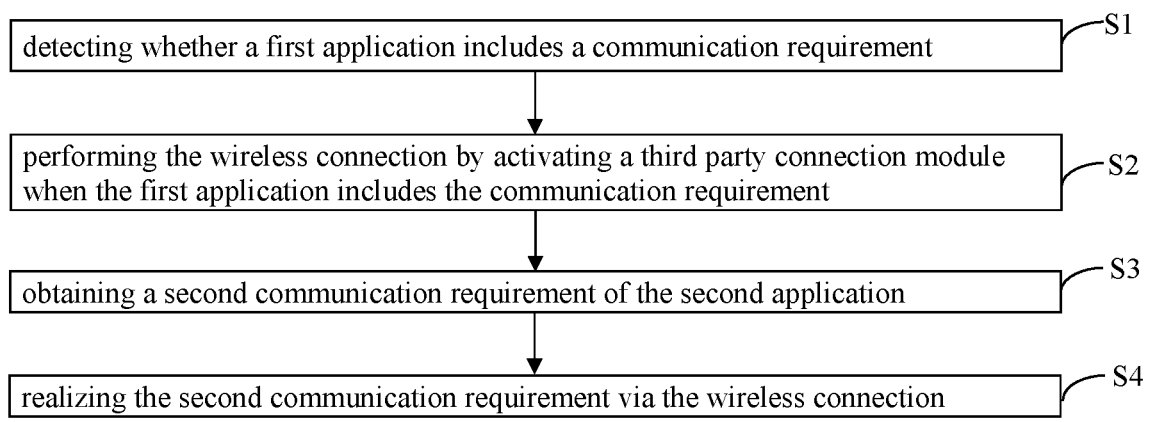
FIG. 2 shows a flow chart of a method for establishing a wireless connection for application of user equipment according to a preferred embodiment of the present invention.

As shown in FIG. 2, the method further includes:

S3, obtaining a second communication requirement of a second application; and

S4, realizing the second communication requirement via the wireless connection.

The steps S1 and S2 in FIG. 2 are the same as or substantially the same as the steps S1 and S2 in FIG. 1, and are not described herein again and are merely included herein by reference.

The first application includes the "kernel-level application" of the user equipment relative to an "application-level application". If the kernel-level application and a wireless access point establish the wireless connection, other application of the user equipment can also establish a wireless connection through the wireless access point so as to realize the communication requirements of other applications.

In the step S3, the second communication requirement of the second application in the user equipment is obtained. Those skilled in the art can understand that when the first application in the user equipment is a kernel-level application and establishes the wireless connection with a wireless access point, then other application of the user equipment can establish a wireless connection through the wireless access point to realize the communication requirements of other applications. Specifically, the second communication requirement of the second application in the user equipment can be obtained through a server corresponding to the second application. For example, if the second application is a video application and the second communication requirement is a video download, the video application can transmit a request for downloading the video to a corresponding server. Correspondingly, the server corresponding to the video application obtains the request for downloading the video, and provides the video that the user equipment requests to download to the user equipment.

In the step S4, the second communication requirement of the second application is realized via the wireless connection, wherein the wireless connection is established by the first application, and the second application can realize the second communication requirement via the wireless connection. Specifically, the second application can realize the second communication requirement via the wireless connection established by the first application and the information interaction with the server. For example, the second application is a video application that can download video via the established wireless connection.

Compared with the conventional art, the present application detects that whether the first application includes the communication requirement in the user equipment. When there is the communication requirement, the present application performs the wireless connection by activating the corresponding third party connection module. The performing wireless connection includes transmitting the request of wireless access information to the corresponding network equipment; receiving access information of one or multiple wireless access points transmitted by the corresponding network equipment in response to the request; and establishing the wireless connection between the user equipment and one of the wireless access points in response to the access information of at least one of the one or multiple wireless access points to realize the communication requirement. In this way, the user is provided with a suitable wireless access point according to different types of applications, and the user experience for a variety of different applications is enhanced.

Moreover, the first application of the present application can further include a kernel-level application of the user equipment. That is, when the first application has established the wireless connection with the wireless access point suitable for the application, other application of the user equipment can also through the wireless access points to establish a wireless connection in order to realize the communication requirements of other applications. In this way, the optimal wireless access point suitable for the first application is selected, the user experience on the first application can be guaranteed, and the user's adoption of other applications is not affected.

In addition, the present application can also realize that when the first application includes the communication requirement, the corresponding third party connection module is loaded in real time to perform the wireless connection. In this case, the corresponding third party connection module already exists on the user equipment and the corresponding network equipment does not need to provide it again. When the first application has the communication requirement, the user equipment can establish the wireless connection with the corresponding wireless access point as long as the user equipment loads the third party connection module in real time, thereby increasing the speed for the user to establish the wireless connection.

Figure 3:
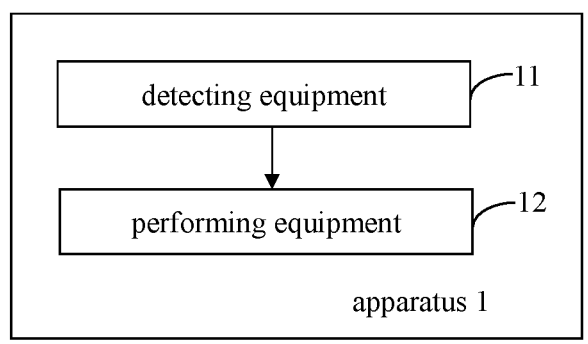
FIG. 3 shows a schematic diagram of an apparatus for establishing a wireless connection for application of user equipment according to another aspect of the present invention.

FIG. 3 shows an apparatus for establishing a wireless connection for an application in a user equipment provided in another aspect of the present application. The apparatus includes a detecting equipment, configured to detect whether the first application includes a communication requirement; and a performing equipment, configured to perform the wireless connection by activating a third party connection module when the first application includes the communication requirement; wherein the performing wireless connection includes transmitting a request of wireless access information to a network equipment; receiving access information of one or multiple wireless access points transmitted by the network equipment in response to the request; and establishing the wireless connection between the user equipment and one of the wireless access points in response to the access information of at least one of the one or multiple wireless access points to realize the communication requirement of the first application.

In this embodiment, the detection equipment detects whether the first application includes a communication requirement, wherein the first application can include a social application, a payment application, a game application, a video application, and those applications which can be downloaded in the each application market. The first application can also include an application provided by the user equipment system. The communication requirement can include that the application is activated, a page is refreshed by the user in the application, information is transmitted and received in the application, etc. Specifically, the manner of detecting whether the first application includes a communication requirement can include activating a third party plug-in member within the first application.

In this embodiment, the wireless connection is performed by activating the third party connection module when the first application includes the communication requirement. The third party connection module is configured to establish the wireless connection between the wireless access point and the user equipment. Preferably, the network equipment provides the third party connection module. Specifically, when the user equipment needs to establish the wireless connection with the wireless access point, the corresponding network equipment provides the third party connection module to the user equipment to establish a wireless connection. Moreover, when the user equipment needs the same third party connection module to establish the wireless connection again, if the third party connection module already exists in the user equipment, the user equipment can directly load the third party connection module to establish the wireless connection. If the third party connection module does not exist in the user equipment, the corresponding network equipment will provide the third party connection module again to the user equipment to establish the wireless connection. Specifically, when the first application includes the communication requirement, that is, the first application needs to establish the wireless connection, the user equipment activates the third party connection module to perform the wireless connection.

Preferably, the performing equipment is configured to real-time load the third party connection module when the first application includes the communication requirement. For example, if the user equipment has established the wireless connection with a certain wireless access point through the third party connection module or the third party connection module already exists in the user equipment, when the first application includes the communication requirement, the user equipment can load in real time the third party connection module existing on the user equipment to perform the wireless connection. For example, if the first application is a video application, the video application had previously downloaded the video through the China Mobile's wireless hotspot. That is, the user equipment has included the third party connection module corresponding to the China Mobile's hotspot. When the video application needs to download the video again, it just needs to load the third party connection module in real time to perform the wireless connection.

The performing the wireless connection includes transmitting a request of wireless access information to a network equipment; receiving access information of one or multiple wireless access points transmitted by the network equipment in response to the request; establishing the wireless connection between the user equipment and one of the wireless access points in response to the access information of at least one of the one or multiple wireless access points to realize the communication requirement.

In this embodiment, the performing equipment is configured to transmit the request of the wireless access information to the corresponding network equipment, wherein the network equipment is configured to provide the user equipment with the third party connection module and the wireless access point that is preferably suitable for the first application to establish the wireless connection. The request of the wireless access information is used to request the wireless access point that is preferably suitable for the first application, from the network equipment corresponding to the first application. Specifically, the first application transmits the request of the wireless access information to the corresponding network equipment in response to the respective communication protocol through the wireless connection established between the network equipment and the user equipment Preferably, the request of the wireless access information includes application-related information of the first application.

More preferably, the application-related information includes at least one of application type information of the first application and communication type information associated with the communication requirement.

Specifically, the application types include but are not limited to applications that can exist in the user equipment, such as social applications, payment applications, game applications, video applications, shopping applications, O2O applications, and so on. The communication types include but are not limited to transmitting-receiving Information, online payment, video downloads, online shopping, and so on, that can achieve information exchange through the applications. The application type information or the communication type information includes at least one of a security priority type, a bandwidth priority type, and a connection success rate priority type. Specifically, the security priority type refers to the primary consideration of security factors when making wireless access point selection. The security priority type should be prioritized for applications that involve very important information about the user's privacy or property information. For example, for payment applications, secure wireless access points should be chosen. The bandwidth priority type refers to the primary consideration of bandwidth factors when making wireless access point selection. The bandwidth priority should be prioritized for applications that require greater bandwidth for a better experience. For example, for some game applications or video applications, in order to enhance the user experience, a larger bandwidth wireless access point should be selected. The connection success rate priority type refers to the primary consideration of connection success rate when making wireless access point selection, for the applications related to transmitting-receiving or browsing information and other types of applications, as long as the connection success rate priority can be considered. For example, for social applications, the wireless access point that is easy to be connected should be selected.

In this embodiment, the performing equipment receives access information of one or multiple wireless access points transmitted by the network equipment in response to the request, wherein the access information matches the application-related information. Those skilled in the art can understand that when the network equipment receives the request of wireless access information transmitted by the first application, the access information of one or multiple wireless access points suitable for the first application can be selected and transmitted to the first application. Correspondingly, the first application receives the information. Specifically, the first application receives the access information of one or multiple wireless access points transmitted by the network equipment in response to the request, based on the respective communication protocol through the wireless connection established between the network equipment and the user equipment. The access information matches the application-related information. For example, if the application-related information of the first application is a security priority type, the request of wireless access information correspondingly requests access to the security priority type wireless access point, and accordingly, the corresponding network equipment selects the access information of one or multiple wireless access points, and transmits the access information to the first application. Correspondingly, the first application receives the access information of the security priority type wireless access point.

In this embodiment, the performing equipment establishes the wireless connection between the user equipment and one of the wireless access points in response to the access information of at least one of the one or multiple wireless access points to realize the communication requirement, wherein the first application can include an "application-level application" and a "kernel-level application". For the application-level application, if the application has established the wireless connection with one wireless access point, other application of the user equipment may not be able to establish a wireless connection through this wireless access point. It needs to select preferable wireless access points again through the corresponding network equipment for other applications and achieves the communication requests of other applications. Those skilled in the art can understand that the corresponding network equipment preferably selects the access information of one or multiple wireless access points suitable for the application of the user equipment, and the user can select a wireless access point to be used according to his/her own requirement so as to establish the wireless connection between the user equipment and the wireless access point to realize the communication requirement. Specifically, when the corresponding network equipment selects a wireless access point suitable for the first application in the user equipment, the user selects the wireless access point to establish the wireless connection between the user equipment and the wireless access point to realize the communication requirement. When the corresponding network equipment selects multiple wireless access points suitable for the first application in the user equipment, the user can select one of the multiple wireless access points to establish the wireless connection between the user equipment and the wireless access point to realize the communication requirement.

Preferably, the third party connection module includes connection frame information generated in response to security policy information of the corresponding wireless access point, and the wireless access point information includes connection authentication information of the corresponding wireless access point, wherein the connection authentication information is generated in response to security authentication information of the corresponding wireless access point.

The establishing the wireless connection between the user equipment and one of the wireless access points in response to the access information of at least one of the one or multiple wireless access points includes performing one of the connection authentication information and the connection frame information of the access information of at least one of the one or multiple wireless access points of the wireless access points to establish the wireless connection.

Specifically, the security policy information and the security authentication information are set by a provider of the wireless access point, and the security policy information can include authentication methods or processes of the provider to the user equipment requesting to access the wireless access point and token or identity authentication. Preferably, the connection authentication information includes access token information or an access account and password information of the wireless access point. The connection frame information and the connection authentication information are respectively generated in response to the security policy information and the security authentication information of the wireless access point, and the different security policy information corresponds to different connection frame information, wherein the connection frame information can exist in the form of a frame package. Similarly, different security authentication information corresponds to different connection authentication information.

The establishing the wireless connection between the user equipment and one of the wireless access points in response to the access information of at least one of the one or multiple wireless access points includes performing one of the connection authentication information and the connection frame information of the access information of at least one of the one or multiple wireless access points to establish the wireless connection between the user equipment and the corresponding wireless access point. Those skilled in the art can understand that when the user selects a wireless access point to be wirelessly connected from the one or multiple wireless access point information, the wireless connection between the user equipment and the wireless access point needs to be established. Specifically, the connection authentication information and the connection frame information corresponding to the wireless access point need to be performed. The specific performing method can include loading a frame package corresponding to the connection frame information corresponding to the wireless access point and inputting corresponding connection authentication information. For example, the wireless access point selected by the user is a wireless hot spot of China Telecom and the security policy information corresponding to the wireless hotspot is verified by a token. The user equipment for establishing a wireless connection with the wireless hotspot needs to load the frame package corresponding to the security policy information and input the token provided by China Telecom.

More preferably, the establishing the wireless connection between the user equipment and one of the wireless access points in response to the access information of at least one of the one or multiple wireless access points includes transmitting an access information request of a target access point to the network equipment in response to a selection operation of the user to the target access point; and establishing the wireless connection between the user equipment and the target access point in response to the access information of the target access point returning from the network equipment.

The access information includes information required for establishing a network connection through a wireless access point, and generally includes information such as an SSID, a MAC address, and an access password of the wireless access point. Specifically, when the network equipment preferably selects one wireless access point information for the user, the wireless access point is a target access point. When the network equipment selects multiple wireless access point information for the user, the user first selects one wireless access point from the multiple wireless access points as the target access point, and the specific selection manner can be based on the user's own preference. After determining the target hotspot, the user equipment transmits an access information request about the target access point to the corresponding network equipment. Correspondingly, the network equipment returns information such as an SSID, a MAC address, and an access password of the target access point, the user equipment can automatically establish a wireless connection with the target access point in response to the information, or the user can also manually input and establish the wireless connection between the user equipment and the target access point in response to the information. For example, when the access information is an access password, the user receives the password returned by the network equipment and simply enters the password to establish the wireless connection between the user equipment and the target access point.

In a preferred embodiment, the first application includes a kernel-level application of the user equipment.

Figure 4:
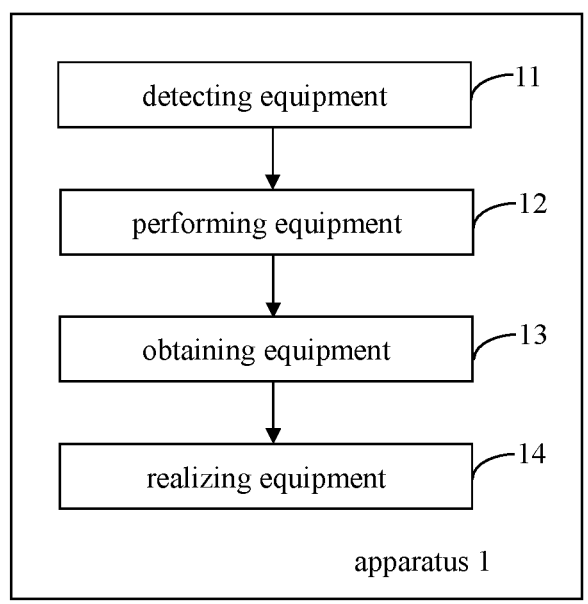
FIG. 4 shows a schematic diagram of an apparatus for establishing a wireless connection for application of user equipment according to another preferred embodiment of the present invention.

As shown in FIG. 4, the apparatus further includes an obtaining equipment, configured to obtain a second communication requirement of the second application; and a realizing equipment, configured to realize the second communication requirement via the wireless connection.

The detecting equipment and the performing equipment in FIG. 4 are the same as or substantially the same as the detecting equipment and the performing equipment in FIG. 3, and are not described herein again and are merely included herein by reference.

The first application includes the "kernel-level application" of the user equipment relative to an "application-level application". If the kernel-level application and a wireless access point establish the wireless connection, other application of the user equipment can also establish a wireless connection through the wireless access point so as to realize the communication requirements of other applications.

In this embodiment, the obtaining equipment obtains the second communication requirement of the second application in the user equipment. Those skilled in the art can understand that when the first application in the user equipment is a kernel-level application and establishes the wireless connection with a wireless access point, then other application of the user equipment can establish a wireless connection through the wireless access point to realize the communication requirements of other applications. Specifically, the second communication requirement of the second application in the user equipment can be obtained through a server corresponding to the second application. For example, if the second application is a video application and the second communication requirement is a video download, the video application can transmit a request for downloading the video to a corresponding server. Correspondingly, the server corresponding to the video application obtains the request for downloading the video, and provides the video that the user equipment requests to download to the user equipment.

In this embodiment, the realizing equipment realizes the second communication requirement of the second application via the wireless connection, wherein the wireless connection is established by the first application, and the second application can realize the second communication requirement through the wireless connection. Specifically, the second application can realize the second communication requirement through the wireless connection established by the first application and the information interaction with the server. For example, the second application is a video application that can download video through the established wireless connection.

Compared with the conventional art, the present application detects that whether the first application includes the communication requirement in the user equipment. When there is the communication requirement, the present application performs the wireless connection by activating the corresponding third party connection module. The performing wireless connection includes transmitting the request of wireless access information to the corresponding network equipment; receiving access information of one or multiple wireless access points transmitted by the corresponding network equipment in response to the request; and establishing the wireless connection between the user equipment and one of the wireless access points in response to the access information of at least one of the one or multiple wireless access points to realize the communication requirement. In this way, the user is provided with a suitable wireless access point according to different types of applications, and the user experience for a variety of different applications is enhanced.

Moreover, the first application of the present application can further include a kernel-level application of the user equipment. That is, when the first application has established the wireless connection with the wireless access point suitable for the application, other application of the user equipment can also through the wireless access points to establish a wireless connection in order to realize the communication requirements of other applications. In this way, the optimal wireless access point suitable for the first application is selected, the user experience on the first application can be guaranteed, and the user's adoption of other applications is not affected.

In addition, the present application can also realize that when the first application includes the communication requirement, the corresponding third party connection module is loaded in real time to perform the wireless connection. In this case, the corresponding third party connection module already exists on the user equipment and the corresponding network equipment does not need to provide it again. When the first application has the communication requirement, the user equipment can establish the wireless connection with the corresponding wireless access point as long as the user equipment loads the third party connection module in real time, thereby increasing the speed for the user to establish the wireless connection.

It is apparent to those skilled in the art that the present invention is not limited to the details of the above-mentioned exemplary embodiments. The present invention may be embodied in other specific forms without departing from the spirit or essential characteristics of the present invention. Thus, the above-mentioned exemplary embodiments are to be considered illustrative but not restrictive. The scope of the present invention is indicated in the appended claims rather than in the above-mentioned description. All changes which come within the meaning and range of equivalency elements of the present invention are to be viewed within the present invention. In addition, the word "comprising" or "comprises" does not exclude other elements or steps, and the singular expression does not exclude the plural conditions. A plurality of elements stated in the apparatus claims may also be implemented by one elements. The first, second, and etc. terms are used to identify different components and do not represent any particular order.

What is claimed is:

1. A method for establishing a wireless connection for application of a user equipment, comprising:
    detecting whether a first application on the user equipment comprises a communication requirement; and
    performing the wireless connection by activating a third party connection module when the first application comprises the communication requirement; wherein the third party connection module includes connection framework information, and the connection framework information is generated based on a security policy of a wireless access point; wireless access point information includes connection verification information corresponding to the wireless access point, and the connection verification information is generated based on security verification information of the wireless access point; wherein if the third party connection module already exists in the user equipment, the user equipment directly loads the third party connection module to establish the wireless connection; if the third party connection module does not exist in the user equipment, the third party connection module will be provided by a corresponding network equipment;
    wherein the performing step comprises:
    transmitting a request of the wireless access point information to the network equipment; wherein the network equipment stores a plurality of the wireless access point information;
    receiving access information of one or multiple wireless access points transmitted by the network equipment in response to the request; and
    establishing the wireless connection between the user equipment and one of the wireless access points in response to the connection verification information and the connection framework information of at least one of the one or multiple wireless access points.

2. The method of claim 1, wherein the performing step further comprises, when the first application comprises the communication requirement, real-time loading the third party connection module.

3. The method of claim 1, wherein the request comprises application-related information of the first application, and the access information matches the application-related information.

4. The method of claim 3, wherein the application-related information comprises application type information of the first application, or communication type information associated with the communication requirement of the first application.

5. The method of claim 4, wherein the application type information or the communication type information comprises a security priority type, a bandwidth priority type, or a connection success rate priority type.

6. The method of claim 3, wherein the performing step further comprises, when the first application comprises the communication requirement, real-time loading the third party connection module.

7. The method of claim 1, wherein the establishing the wireless connection between the user equipment and one of the wireless access points in response to the connection verification information and the connection framework information of at least one of the one or multiple wireless access points comprises:
    transmitting an access information request of a target access point to the network equipment in response to a selection operation of the user to the target access point; and
    establishing the wireless connection between the user equipment and the target access point in response to the access information of the target access point returning from the network equipment.

* * * * *